(12) United States Patent
Senga et al.

(10) Patent No.: US 6,485,824 B2
(45) Date of Patent: Nov. 26, 2002

(54) REVERSIBLY THERMOCHROMIC LIGHT-SHIELDING/LIGHT-TRANSMITTING LAMINATE MEMBER

(75) Inventors: Kuniyuki Senga, Aichi (JP); Jun Sugai, Aichi (JP); Shigehiro Koide, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 09/998,408

(22) Filed: Dec. 3, 2001

(65) Prior Publication Data

US 2002/0066890 A1 Jun. 6, 2002

(30) Foreign Application Priority Data

Dec. 4, 2000 (JP) ........................................ 2000-368016
Oct. 15, 2001 (JP) ........................................ 2001-316343

(51) Int. Cl.$^7$ ............................ B32B 11/02; B32B 5/16; B32B 5/30
(52) U.S. Cl. .................. 428/323; 428/332; 428/913; 428/413; 428/423.1; 428/474.4; 428/480; 252/582; 252/583; 252/586
(58) Field of Search ................................ 428/913, 332, 428/323, 320.2, 221.5, 402.2, 923, 413, 423.1, 474.4, 480; 252/582, 583, 586

(56) References Cited

U.S. PATENT DOCUMENTS

| | | | |
|---|---|---|---|
| 4,028,118 A | 6/1977 | Nakasuji et al. | ............... 106/21 |
| 4,720,301 A | 1/1988 | Kito et al. | ..................... 106/21 |
| 4,732,810 A | 3/1988 | Kito et al. | ............... 428/402.2 |
| 5,490,956 A | 2/1996 | Kito et al. | ................... 252/583 |
| 5,928,803 A | * 7/1999 | Yasuda | ....................... 428/913 |

* cited by examiner

Primary Examiner—Vivian Chen
Assistant Examiner—Nikolas J Uhlir
(74) Attorney, Agent, or Firm—Sughrue Mion, PLLC

(57) ABSTRACT

A reversibly thermochromic light-shielding/light-transmitting laminate member. More particularly, the invention relates to a reversibly thermochromic light-shielding/light-transmitting laminate member which changes not only in color but in transmittance with temperature.

5 Claims, No Drawings

REVERSIBLY THERMOCHROMIC LIGHT-SHIELDING/LIGHT-TRANSMITTING LAMINATE MEMBER

FIELD OF THE INVENTION

The present invention relates to a reversibly thermochromic light-shielding/light-transmitting laminate member. More particularly, the invention relates to a reversibly thermochromic light-shielding/light-transmitting laminate member, which changes not only in color but in transmittance with temperature.

BACKGROUND OF THE INVENTION

A laminate member which undergoes alternate color changes between a colorless transparent state and a colored opaque state with temperature is disclosed in U.S. Pat. No. 5,490,956. This laminate member comprises a substrate and formed thereon a reversibly thermochromic layer comprising a vinyl chloride/vinyl acetate copolymer resin matrix and dispersed therein a reversibly thermochromic composition comprising (a) an electron-donating color-forming organic compound, (b) an electron-accepting compound, and (c) a reaction medium determining the temperatures at which the color reactions of component (a) with component (b) take place.

The thermochromic composition contained in the reversibly thermochromic layer is not encapsulated, i.e., of the so-called non-capsule type. Because of this, not only the thermochromic layer has a factor contributing to chemical instability, but also the substrate is limited in material. With respect to thermochromic properties, the laminate member has such color-memorizing properties that it is wide hysteretic and memorizes and retains a color-changed state resulting from a temperature change.

SUMMARY OF THE INVENTION

An aim of the invention is to eliminate the drawbacks of the known reversibly thermochromic laminate member which undergoes alternate color changes between a colorless transparent state and a colored opaque state. Namely, the aim is to provide a reversibly thermochromic light-shielding/light-transmitting laminate member which has a satisfactory thermochromic function and is free from the factor contributing to chemical instability inherent in the system employing a non-capsule type reversibly thermochromic composition.

The invention provides a reversibly thermochromic light-shielding/light-transmitting laminate member which comprises a substrate and formed thereon a reversibly thermochromic layer comprising a transparent resin and fixedly dispersed therein a reversibly thermochromic microencapsulated pigment containing a reversibly thermochromic composition comprising (a) an electron-donating color-forming organic compound, (b) an electron-accepting compound, and (c) a reaction medium determining the temperatures at which the color reactions of component (a) with component (b) take place, the reversibly thermochromic microencapsulated pigment being a deformable pigment which has an average particle diameter of from 0.1 to 5.0 µm, the transparent resin having a tensile elongation at break of 350% or lower. In the laminate member of the invention, the proportion of the reversibly thermochromic microencapsulated pigment to the transparent resin is preferably from 1/0.5 to 1/20 (in terms of weight ratio on a solid basis) and the reversibly thermochromic layer preferably has a thickness of from 5 to 100 µm. Furthermore, the transparent resin is preferably a resin selected from the group consisting of methyl methacrylate resins, acrylic resins, vinyl chloride/vinyl acetate copolymer resins, ethylene/vinyl acetate copolymer resins, saturated polyester resins, unsaturated polyester resins, butyral resins, polyurethane resins, polyamide resins, styrene resins, acrylic/styrene resins, ketone resins, and epoxy resins. In one embodiment of the invention, the laminate member has, formed over the reversibly thermochromic layer, a metallic glossy layer containing a metallic luster pigment having transparency. This metallic glossy layer preferably has a light transmittance of 5% or higher.

DETAILED DESCRIPTION OF THE INVENTION

The laminate member of the invention, which undergoes alternate color changes between a colorless transparent state and a colored opaque state with temperature, is obtained based on a combination of a reversibly thermochromic microencapsulated pigment having an average particle diameter of from 0.1 to 5.0 µm with a transparent resin having a tensile elongation at break of 350% or lower, as stated above.

More particularly, the reversibly thermochromic layer comprising a combination of a reversibly thermochromic microencapsulated pigment having an average particle diameter of from 0.1 to 5.0 µm with a transparent resin having a tensile elongation at break of 350% or lower is presumed to undergo the following phenomena.

The microencapsulated pigment has different capsule shapes depending on whether the reversibly thermochromic composition contained therein is in a solid state, i.e., a colored state, or is in a dissolved state, i.e., a decolored state. Specifically, when the encapsulated composition is in a dissolved state (decolored state), then the capsules have a degree of freedom and are deformable because the reversibly thermochromic composition is liquid. However, when the encapsulated composition is in a solid state (colored state), the capsules have recesses in the surface thereof, which were formed upon solidification of the reversibly thermochromic composition, and are hard and less apt to be deformed.

On the other hand, the transparent resin used in the invention has an elongation as low as 350% or below and does not conform to capsule shape changes with temperature. In addition, the microencapsulated pigment is kept fixed while retaining a given shape. From these, the following can be presumed. When the encapsulated reversibly thermochromic composition is in a dissolved state (decolored state), the capsules have a degree of freedom in shape change and are dispersed while in close contact with the surrounding transparent resin. However, when the reversibly thermochromic composition is in a solid state (colored state), the capsules have recesses in the surface thereof, resulting in spaces between the capsules and the transparent resin which has been in close contact therewith or resulting in spaces inside the capsules. This change in combination with color changes produces the following effects. When the reversibly thermochromic composition is in a solid state, the reversibly thermochromic layer is in a colored state and is opaque due to a bleaching phenomenon caused by light scattering by the spaces. When the reversibly thermochromic composition is in a dissolved state, the reversibly thermochromic layer is in a decolored state and is transparent because the light-scattering phenomenon attributable to the spaces does not occur since the capsules are in close contact with the transparent resin.

Requirements for enabling the color changes to occur include the particle diameter of the capsules which is regulated to 0.1 to 5.0 μm. The reasons for this are as follows. In case where the particle diameter of the capsules is smaller than 0.1 μm, not only satisfactory thermochromic properties cannot be obtained, but also such capsules should have a reduced wall thickness and hence have poor durability in secondary processing, making it difficult to satisfy suitability for practical use. In case where the particle diameter thereof exceeds 5.0 μm, the microencapsulated pigment itself has considerably reduced light transmission and, hence, the reversibly thermochromic layer in a decolored state has reduced light transmission. The particle diameter of the capsules is preferably from 0.3 to 3.0 μm, more preferably from 0.5 to 2.0 μm. Use of such capsules enables the reversibly thermochromic layer to show transparency and a sufficient color density in a colored state, be reduced in a residual color in a decolored state, and have excellent sharpness in color change. Namely, the reversibly thermochromic layer can have an excellent balance among thermochromic functions.

As described above, the invention is based on such an epoch-making technique that light transmission in a decolored state and opacity (hiding properties) in a colored state are attained respectively by using capsules having a reduced particle size and by using a combination of a transparent resin having a tensile elongation at break of 350% or lower with a microencapsulated pigment which is deformable.

The proportion of the microencapsulated pigment to the transparent resin in terms of weight ratio on a solid basis is preferably from 1/0.5 to 1/20, more preferably from 1/1 to 1/10. The thickness of the reversibly thermochromic layer is preferably from 5 to 100 μm, more preferably from 30 to 60 μm.

In case where the proportion of the microencapsulated pigment to the transparent resin in terms of weight ratio on a solid basis exceeds 1/0.5, the pigment content is so high that transparency is reduced and the reversibly thermochromic coating layer has a reduced strength. In case where the proportion thereof is lower than 1/20, i.e., the proportion of the transparent resin exceeds the upper limit, then an excessively large film thickness is necessary for obtaining a satisfactory color density and this leads to insufficient drying and to problems concerning coating period, etc. Thus, such too high proportions of the transparent resin are unsuitable for practical use.

Thicknesses of the reversibly thermochromic layer smaller than 5 μm result not only in difficulties in obtaining a satisfactory color tone in a colored state but also in poor hiding properties. On the other hand, thicknesses thereof exceeding 100 μm may impair the transparency of the layer in a decolored state.

The reversibly thermochromic composition comprises three ingredients, i.e., (a) an electron-donating compound, (b) an electron-accepting compound, and (c) a reaction medium determining the temperatures at which the color reactions between components (a) and (b) take place. As this composition can be used, for example, the compositions proposed by the applicant which are disclosed in U.S. Pat. Nos. 4,028,118 and No. 4,732,810.

This composition changes in color at a given temperature (color change point) in such a manner that the composition is in a decolored state at temperatures not lower than the color change point and is in a colored state at temperatures lower than the color change point. At ordinary temperature, the composition exists only in specific one of the two states. Namely, the other state is maintained only during the period in which heat or cold required for the development of this state is kept being applied, and the composition returns to the original ordinary-temperature state upon removal of the heat or cold. This composition is a reversibly thermochromic composition of the heating decoloration type which shows such a thermochromic behavior in which the hysteresis range is relatively narrow.

Also usable is the thermochromic composition which is disclosed in U.S. Pat. No. 4,720,301. This composition shows enhanced hysteresis. Namely, plotting the color density against temperature gives a curve showing that the composition changes in color along routes which differ considerably between the case where the composition is heated from a temperature on the lower-temperature side of the color change temperature range and in the reverse case where the composition is cooled from a temperature on the higher-temperature side of the color change temperature range. This composition is a thermochromic color-memorizing composition of the heating decoloration type in which the colored state in the range of temperatures not higher than the lower color change point and the decolored state in the range of temperatures not lower than the higher color change point can be alternately memorized and retained even after the heat or cold required for the color change has been removed.

Furthermore, a reversibly thermochromic composition of the heating coloration type can also be used which contains as an electron-accepting compound (b) a specific alkoxyphenol compound having a linear or branched alkyl group having 3 to 18 carbon atoms.

The reversibly thermochromic composition is microencapsulated and used as a microencapsulated pigment. This microencapsulation enables the composition to develop a bright color having a high density and satisfy practical properties such as homogeneity, dispersion stability, chemical resistance, and heat resistance.

For the microencapsulation, known techniques can be used. Examples thereof include interfacial polymerization, in-situ polymerization, in-liquid curing coating, phase separation from an aqueous solution, phase separation from an organic solvent, melt dispersion cooling, air-suspension coating, and spray drying.

Before the microencapsulated pigment is subjected to practical use, the surface properties of the microcapsules may be modified according to purposes.

The microencapsulated pigment is dispersed into a medium containing the resin to prepare a coloring material such as an ink or coating composition. This coloring material is applied to a substrate to thereby form a reversibly thermochromic layer.

Adding a non-thermochromic dye or pigment enables a color change from a colored opaque state (1) to a colored transparent state (2).

For forming the thermochromic layer, known techniques can be used. Examples thereof include printing techniques such as screen printing, offset printing, gravure printing, coater printing, tampon printing, and transfer printing and coating techniques such as brush coating, spray coating, electrostatic coating, electrodeposition, curtain coating, roller coating, and dip coating.

Examples of the material of the substrate include papers, synthetic papers, artificial leathers, natural leathers, plastics, glasses, porcelains and pottery, woods, stones, and metals.

The substrate may have a flat shape or may have recesses and protrusions.

Since the reversibly thermochromic layer of the laminate member of the invention undergoes alternate color changes between a colorless transparent state and a colored opaque state with temperature, the condition on the opposite side of the substrate can be perceived/hidden when the substrate is made of a transparent material. This laminate member can be applied, for example, to a reversibly thermochromic three-dimensional object comprising a three-dimensional substrate made of a transparent resin, the reversibly thermochromic layer formed on the substrate, and an appropriate shaped article enclosed in the three-dimensional substrate. In this reversibly thermochromic object, the shaped article placed inside can be perceived when the thermochromic layer is in a transparent state, and can be hidden when the thermochromic layer is in a colored opaque state.

Examples of the shaped article include dolls and toys modeled on, e.g., animals, vehicles, buildings, plants, foods, or stones.

The shaped article enclosed in the three-dimensional object is preferably in close contact with the three-dimensional object. Namely, the reversibly thermochromic three-dimensional object preferably has such a constitution that it has no space at the interface between the outer surface of the shaped article and the three-dimensional object. This is because the absence of spaces enables the shaped article to be clearly perceived.

The metallic glossy layer which may be formed on the reversibly thermochromic layer will be explained next.

The metallic glossy layer is a layer comprising a binder resin and, fixedly dispersed therein, a metallic luster pigment based on a transparent material, as a core material, selected from natural micas, synthetic micas, flat pieces of glasses, and flaky aluminum oxide.

The metallic glossy layer not only imparts any of various colors with a metallic luster to the reversibly thermochromic layer, but also functions as a light-shielding layer. Namely, due to its light-absorbing (or light-reflecting) function and light-shielding function, the metallic glossy layer absorbs or reflects at least part of ultraviolet and visible rays, which may adversely influence the functions of the reversibly thermochromic layer. Thus, the metallic glossy layer further has the effect of improving the light resistance of the reversibly thermochromic layer.

Effective metallic luster pigments based on a natural mica as a core material include one obtained by coating the surface of natural-mica particles with titanium oxide, one obtained by coating the surface of natural-mica particles with titanium oxide and then further coating the coated particles with iron oxide, and one obtained by coating the surface of natural-mica particles with titanium oxide and then further coating the coated particles with a non-thermochromic dye or pigment (preferably in an amount of from 0.5 to 10% by weight). Specific examples thereof include: a gold metallic luster pigment having a particle size of from 5 to 50 $\mu$m obtained by coating the surface of a natural mica with 41 to 44% by weight titanium-oxide; a gold metallic luster pigment having a particle size of from 5 to 60 $\mu$m obtained by coating the surface of a natural mica with 30 to 38% by weight titanium oxide and further coating the coated particles with 0.5 to 10% by weight non-thermochromic color pigment; a silver metallic luster pigment having a particle size of from 5 to 100 $\mu$m obtained by coating the surface of a natural mica with 16 to 39% by weight titanium oxide; a metallic luster pigment obtained by coating the surface of a natural mica with 45 to 58% by weight titanium oxide; and a metallic luster pigment obtained by coating the surface of a natural mica with 45 to 58% by weight titanium oxide and then further coating the coated particles with 0.5 to 10% by weight non-thermochromic color dye or pigment. The "% by weight" used above is based on the total weight of the metallic luster pigment.

Metallic luster pigments based on a synthetic mica as a core material have a lower impurity content and a lower content of iron and other metal ions, which are a coloring factor, as compared with the metallic luster pigments based on a natural mica. Because of this, the pigments based on a synthetic mica have excellent transparency and is highly lustrous and glittering. Effective examples thereof include a pigment which is obtained by coating the surface of a synthetic mica with one or more metal oxides comprising titanium oxide as the main component and has an average particle thickness of from 0.1 to 5 $\mu$m and an average particle diameter of from 2 to 1,000 $\mu$m. This pigment has a metallic luster of a gold, silver, or another color depending on the degree of coating with the metal oxides. It is so transparent that the color tone of the underlying reversibly thermochromic layer can be clearly perceived.

Examples of the synthetic mica include ones represented by the following formula. One example is $KMg_3(AlSi_3O_{10})F_2$.

$$X_{1/3-1}Y_{2-3}Z_4O_{10}F_2 \tag{1}$$

(In formula (1), X represents $Na^+$, $Li^+$, $K^+$, $Ca^{2+}$, $Sr^{2+}$, or $Ba^{2+}$; Y represents one or more members selected from $Mg^{2+}$, $Li^+$, $Ni^{2+}$, $Co^{2+}$, $Zn^{2+}$, $Mn^{2+}$, $Al^{3+}$, $Cr^{3+}$, and $Ti^{3+}$; and Z represents one or more members selected from $Al^{3+}$, $Si^{4+}$, $GE^{4+}$, and $B^{3+}$.)

The shape of the mica is not particularly limited, and examples thereof include flat shapes and flaky shapes.

Examples of the metal oxides with which the surface of the synthetic mica is coated include oxides of metals such as titanium, zirconium, chromium, vanadium, and iron. However, it is preferred to use one or more metal oxides comprising titanium oxide as the main component.

The metallic luster pigments based on a synthetic mica as a core material are effective when the average particle thickness thereof is generally from 0.1 to 5 $\mu$m and the average particle diameter thereof is generally from 2 to 1,000 $\mu$m, preferably from 2 to 500 $\mu$m, more preferably from 2 to 200 $\mu$m. This average particle diameter means the average particle diameter which is determined by laser diffractometry and is the particle diameter corresponding to the 50% point in a cumulative median diameter distribution on a volume basis.

Specific examples of the metallic luster pigments comprising a synthetic mica whose surface is coated with a metal oxide include "Ultimica" (trade name) SB-100 (5–30 $\mu$m; silver), SD-100 (10–60 $\mu$m; silver), SE-100 (15–100 $\mu$m; silver), SF-100 (44–150 $\mu$; silver), SH-100 (150–600 $\mu$m; silver), YB-100 (5–30 $\mu$m; gold), YD-100 (10–60 $\mu$m; gold), YE-100 (15–100 $\mu$m; gold), YF-100 (44–150 $\mu$m; gold), RB-100 (5–300 $\mu$m; metallic red), RD-100 (10–60 $\mu$m; metallic red), RE-100 (15–100 $\mu$m; metallic red), RF-100 (44–150 $\mu$m; metallic red), RBB-100 (5–30 $\mu$m; metallic purple), RBD-100 (10–60 $\mu$m; metallic purple), RBE-100 (15–100 $\mu$m; metallic purple), RBF-100 (44–150 $\mu$m; metallic purple), VB-100 (5–30 $\mu$m; metallic violet), VD-100 (10–60 $\mu$m; metallic violet), VE-100 (15–100 $\mu$m; metallic violet), VF-100 (44–150 $\mu$m; metallic violet), BB-100 (5–30

μm; metallic blue), BD-100 (10–60 μm; metallic blue), BE-100 (15–100 μm; metallic blue), BF-100 (44–150 μm; metallic blue), GB-100 (5–30 μm; metallic green), GD-100 (10–60 μm; metallic green), GE-100 (15–100 μm; metallic green), and GF-100 (44–150 μm; metallic green), all manufactured by Nihon Kokenkogyo K.K.

Examples of the metallic luster pigments obtained by coating the surface of flat glass pieces as a core material with titanium oxide include such metallic luster pigments which have a gold, silver, or another metallic color depending on the degree of coating with titanium oxide. Specific examples thereof include the pigments obtained by coating glass flakes with titanium oxide which are manufactured by Nippon Sheet Glass Co., Ltd. and sold under the trade name of "Metashine" RCFSX-5450TS(6041) (average thickness, 5±2 μm; average particle size, 450±145 μm; gold), RCFSX-5200TS(6042) (average thickness, 5±2 μm; average particle size, 200±70 μm; silver), RCFSX-5140TS(6043) (average thickness, 5±2 μm; average particle size, 140±45 μm; silver), RCFSX-5080TS(6044) (average thickness, 5±2 μm; average particle size, 80±30 μm; silver), RCFSX-2080TS(6046) (average thickness, 2±1 μm; average particle size, 80±30 μm; silver), RCFSX-K120TS(6043) (average thickness, 20±5 μm; average particle size, 120±20 μm; silver), RCFSX-5090RC(8052) (average thickness, 5±2 μm; average particle size, 90±30 μm; gold), RCFSX-5090RC(8053) (average thickness, 5±2 μm; average particle size, 90±30 μm; metallic green), RCFSX-5090RC(8069) (average thickness, 5±2 μm; average particle size, 90±30 μm; metallic blue), RCFSX-5090RC(8070) (average thickness, 5±2 μm; average particle size, 90±30 μm; metallic purple), RCFSX-5090RC(8071) (average thickness, 5±2 μm; average particle size, 90±30 μm; metallic red), RCFSX-1040RC(9543) (average thickness, 1 μm; average particle size, 40 μm; silver), RCFSX-1040RC(9544) (average thickness, 1 μm; average particle size, 40 μm; gold), RCFSX-1040RC(9546) (average thickness, 1 μm; average particle size, 40 μm; metallic red), RCFSX-1040RC(9548) (average thickness, 1 μm; average particle size, 40 μm; metallic blue), RCFSX-1040RC(9549) (average thickness, 1 μm; average particle size, 40 μm; metallic green), RCFSX-1020RC(9550) (average thickness, 1 μm; average particle size, 20 μm; silver), RCFSX-1020RC(9551) (average thickness, 1 μm; average particle size, 20 μm, gold), RCFSX-1020RC(9553) (average thickness, 1 μm; average particle size, 20 μm; metallic red), and RCFSX-1020RC(9555) (average thickness, 1 μm; average particle size, 20 μm; metallic blue).

The metallic luster pigments obtained by coating the surface of flaky aluminum oxide as a core material with a metal oxide will be explained below.

Because the core material is flaky aluminum oxide, this kind of metallic luster pigment has a lower impurity content and is more lustrous than the pigments based on a natural mica.

Examples of the metal oxide with which the surface of the aluminum oxide is coated include oxides of metals such as titanium, zirconium, chromium, vanadium, and iron. However, it is preferred to use one or more metal oxides comprising titanium oxide as the main component. Examples of the metallic luster pigments include ones which have a gold, silver, or another metallic color depending on the degree of coating with the metal oxide.

These metallic luster pigments preferably have an average thickness of from 0.1 to 5 μm and an average particle diameter of from 2 to 200 μm.

By using a metallic luster pigment having a thickness and average particle diameter within the respective ranges shown above, it is possible to obtain a metallic glossy image which is evenly lustrous and a thermochromic image undergoing distinct color changes. This average particle diameter means the average particle diameter which is determined by laser diffractometry and is the particle diameter corresponding to the 50% point in a cumulative median diameter distribution on a volume basis.

Specific examples of the metallic luster pigments obtained by coating the surface of flaky aluminum oxide with a metal oxide include the pigment manufactured by Merck & Co., Inc. and sold under the trade name of "Xirallic" T50-10 (10–30 μm; silver).

The metallic luster pigments obtained by coating a core material selected from natural micas, synthetic micas, flat pieces of glasses, and flaky aluminum oxide with a metal oxide have transparency as well as a metallic luster. Of these metallic luster pigments, those obtained by coating a core material selected from synthetic micas, flat pieces of glasses, and flaky aluminum oxide with a metal oxide are suitable for use in the invention because they are superior in transparency.

The metallic glossy layer in the invention has a light transmittance of preferably 5% or higher, more preferably 10% or higher.

Such a light transmittance produces the following effect. When the reversibly thermochromic layer is in a colored state, the metallic glossy layer shows light-shielding properties and a metallic lustrous color is perceived. When the reversibly thermochromic layer is in a decolored state, no metallic lustrous color is perceived and the metallic glossy layer shows excellent transparency.

In the case where the substrate has transparency, an article placed inside or on the back side of the laminate member can be clearly perceived through the laminate member when the light transmittance of the laminate member itself is 5% or higher at the time when the reversibly thermochromic layer is in a decolored state.

In producing the reversibly thermochromic light-shielding/light-transmitting laminate member of the invention, a reversibly thermochromic ink is suitably applied to a substrate. The ink comprises a reversibly thermochromic microencapsulated pigment containing a reversibly thermochromic composition comprising (a) an electron-donating color-forming organic compound, (b) an electron-accepting compound, and (c) a reaction medium determining the temperatures at which the color reactions of component (a) with component (b) take place and a vehicle containing a transparent resin having a tensile elongation at break of 350% or lower. The resultant coating is dried to form a reversibly thermochromic layer, whereby the laminate member of the invention is obtained.

In the case where a metallic glossy layer is to be formed on the reversibly thermochromic layer, a metallic luster ink comprising a vehicle containing a metallic luster pigment is applied to the thermochromic layer to form the metallic glossy layer.

The invention will be explained below in more detail by reference to Examples, but the invention should not be construed as being limited to these Examples. In the following Examples and Comparative Examples, all parts are by weight.

EXAMPLE 1

Production of Reversibly Thermochromic Microencapsulated Pigment

A reversibly thermochromic composition consisting of 3 parts of 1,2-benz-6-(N-ethyl-N-isobutylamino)fluoran as an electron-donating color-forming organic compound (a), 10 parts of 1,1-bis(4-hydroxyphenyl)-n-decane and 2 parts of 2,2-bis(4-hydroxyphenyl)hexafluoropropane as electron-accepting compounds (b), 50 parts of neopentyl stearate as a reaction medium (c), and 3 parts of diheptadecyl ketone as a color change temperature regulator was heated to dissolve the ingredients. Thereto were added 30 parts of an aromatic polyisocyanate prepolymer as a wall material and 40 parts of a co-solvent. The resultant mixture was homogenized to obtain a solution. This solution was poured into an aqueous poly(vinyl alcohol) solution with agitation to emulsify the resultant mixture so that the organic phase formed minute droplets having an average particle diameter of 1.5 µm. An aqueous solution containing 5 parts of diethylenetriamine was added dropwise to the emulsion to encapsulate the reversibly thermochromic composition with a wall made of a polyurea resin formed from the polyisocyanate and the amine. The resultant dispersion was further heated with stirring to obtain a dispersion of a microencapsulated pigment.

The microencapsulated pigment was a thermochromic microencapsulated pigment which became colorless upon heating to 36° C. or higher and turned pink upon cooling to 12° C. or lower. This pigment was examined for particle diameter with a laser type particle size distribution analyzer (LA-300, manufactured by Horiba Ltd.). As a result, the average particle diameter thereof was found to be 1.47 µm.

Preparation of Reversibly Thermochromic Light-Shielding/Light-Transmitting Material Seven parts of the microencapsulated pigment was mixed with 75 parts of a 50% toluene solution of an acrylic resin (elongation at break, 2%) and 75 parts of xylene. This mixture was homogenized by stirring to obtain a reversibly thermochromic light-shielding/light-transmitting material (microencapsulated pigment/resin=1/5.4).

Production of Reversibly Thermochromic Light-Shielding/Light-Transmitting Laminate Member A surface of a hemisphere having a diameter of 12 cm made of a transparent methacrylic resin as a substrate was coated by spraying with the reversibly thermochromic light-shielding/light-transmitting material. The resultant coating was dried at 70° C. for 30 minutes to form a reversibly thermochromic layer.

A teddy bear as a shaped article was placed in the hemisphere and a white ABS plate lid was fixed to the bottom of the hemisphere to enclose the teddy bear.

In the reversibly thermochromic light-shielding/light-transmitting laminate member thus obtained, the reversibly thermochromic layer had a thickness of about 60 µm. Upon cooling to 12° C. or lower, the reversibly thermochromic composition assumed a pink color and, simultaneously therewith, the reversibly thermochromic layer became opaque. As a result, the teddy bear was hidden and the hemisphere became pink. When the laminate member was heated to 36° C. or higher, the reversibly thermochromic composition was decolored and, simultaneously therewith, the reversibly thermochromic layer became highly transparent. As a result, the teddy bear enclosed in the hemisphere could be perceived through the transparent substrate.

EXAMPLE 2

Production of Reversibly Thermochromic Microencapsulated Pigment

A reversibly thermochromic composition consisting of 3 parts of 3-{2-ethoxy-4-(N-ethylanilino)phenyl}-3-(1-ethyl-2-methylindol-3-yl)-4-azaphthalide as an electron-donating color-forming organic compound (a), 10 parts of 1,1-bis(4-hydroxyphenyl)-n-decane and 2 parts of 2,2-bis(4-hydroxyphenyl)hexafluoropropane as electron-accepting compounds (b), 40 parts of stearyl caprate and 10 parts of cetyl caprate as reaction media (c), and 3 parts of stearamide as a color change temperature regulator was heated to dissolve the ingredients. Thereto were added 30 parts of an aromatic polyisocyanate prepolymer as a wall material and 40 parts of a co-solvent. The resultant mixture was homogenized to obtain a solution. This solution was poured into an aqueous poly(vinyl alcohol) solution with agitation to emulsify the resultant mixture so that the organic phase formed minute droplets having an average particle diameter of 2.0 µm. An aqueous solution containing 5 parts of diethylenetriamine was added dropwise to the emulsion to encapsulate the reversibly thermochromic composition with a wall made of a polyurea resin formed from the polyisocyanate and the amine. The resultant dispersion was further heated with stirring to obtain a dispersion of a microencapsulated pigment.

The microencapsulated pigment was a thermochromic microencapsulated pigment which became colorless upon heating to 35° C. or higher and turned blue upon cooling to 25° C. or lower. This pigment was examined for particle diameter with a laser type particle size distribution analyzer (LA-300, manufactured by Horiba Ltd.). As a result, the average particle diameter thereof was found to be 1.86 µm.

Preparation of Reversibly Thermochromic Light-Shielding/Light-Transmitting Material Fifteen parts of the microencapsulated pigment (in the form of aqueous dispersion having a solid content of 55%) was mixed with 100 parts of an emulsion (solid content, 40%) of a polyurethane resin (elongation at break, 225%). This mixture was homogenized by stirring to obtain a reversibly thermochromic light-shielding/light-transmitting material (microencapsulated pigment/resin=1/5.4).

Production of Reversibly Thermochromic Light-Shielding/Light-Transmitting Laminate Member A minicar body as a substrate was molded from a methacrylic resin. The hood thereof was undercoated and then coated with the reversibly thermochromic light-shielding/light-transmitting material by spraying. The resultant coating was dried at 70° C. for 30 minutes to form a reversibly thermochromic layer. The parts other than the hood were coated with a non-thermochromic general blue ink.

A shaped plastic article modeled on an engine was placed in the space under the hood.

In the reversibly thermochromic light-shielding/light-transmitting laminate member thus obtained, the reversibly thermochromic layer had a thickness of about 50 µm. Upon cooling to 25° C. or lower, the reversibly thermochromic composition assumed a blue color and, simultaneously therewith, the reversibly thermochromic layer became opaque. As a result, the engine was hidden and the minicar appeared to be wholly blue. When the laminate member was heated to 35° C. or higher, the reversibly thermochromic composition was decolored and, simultaneously therewith, the reversibly thermochromic layer became highly transparent. As a result, the engine could be perceived through the transparent substrate.

EXAMPLE 3

Production of Reversibly Thermochromic Light-Shielding/Light-Transmitting Laminate Member with Metallic Luster A metallic luster ink obtained by evenly mixing 1 part of a metallic luster pigment (trade name, Metashine RCFSX- 5090(8069); manufactured by Nippon Sheet Glass Co., Ltd.), 5 parts of a xylene solution (solid content, 50%) of an acrylic/polyol resin, 5 parts of xylene, and 1 part of an isocyanate hardener was applied by spraying to the reversibly thermochromic layer of the reversibly thermochromic light-shielding/light-transmitting laminate member produced in Example 2. Thus, a metallic glossy layer was formed. Thereafter, a topcoat ink obtained by evenly mixing 5 parts of a xylene solution (solid content, 50%) of an acrylic/polyol resin, 5 parts of xylene, 1 part of an isocyanate hardener, and 0.1 part of an ultraviolet absorber was applied to the metallic glossy layer by spraying. The resultant coating was dried at 70° C. for 30 minutes to form a transparent topcoat layer.

Upon cooling to 25° C. or lower, the reversibly thermochromic composition in the laminate member thus obtained assumed a blue color and, simultaneously therewith, the reversibly thermochromic layer became opaque. As a result, the engine was hidden and the laminate member was perceived as a minicar in which the hood was of a metallic blue color. When the laminate member was heated to 35° C. or higher, the reversibly thermochromic composition was decolored and, simultaneously therewith, the reversibly thermochromic layer became highly transparent. As a result, the engine could be perceived through the transparent substrate.

The light transmittance of the metallic glossy layer itself was measured with a spectrophotometer (U-3210, manufactured by Hitachi Ltd.) and was found to be 50%. The light transmittances of the laminate member were 4% and 20% when the reversibly thermochromic composition was in a colored state and in a decolored state, respectively.

EXAMPLE 4

Production of Reversibly Thermochromic Light-Shielding/Light-Transmitting Laminate Member with Metallic Luster A metallic luster ink obtained by evenly mixing 1 part of a metallic luster pigment (trade name, Ultimica BD-100; manufactured by Nihon Kokenkogyo K.K.), 5 parts of a xylene solution (solid content, 50%) of an acrylic/polyol resin, 5 parts of xylene, and 1 part of an isocyanate hardener was applied by spraying to the reversibly thermochromic layer of the reversibly thermochromic light-shielding/light-transmitting laminate member produced in Example 2. Thus, a metallic glossy layer was formed. Thereafter, a topcoat ink obtained by evenly mixing 5 parts of a xylene solution (solid content, 50%) of an acrylic/polyol resin, 5 parts of xylene, 1 part of an isocyanate hardener, and 0.1 part of an ultraviolet absorber was applied to the metallic glossy layer by spraying. The resultant coating was dried at 70° C. for 30 minutes to form a transparent topcoat layer.

Upon cooling to 25° C. or lower, the reversibly thermochromic composition in the laminate member thus obtained assumed a blue color and, simultaneously therewith, the reversibly thermochromic layer became opaque. As a result, the engine was hidden and the laminate member was perceived as a minicar in which the hood was of a metallic blue color. When the laminate member was heated to 35° C. or higher, the reversibly thermochromic composition was decolored and, simultaneously therewith, the reversibly thermochromic layer became highly transparent. As a result, the engine could be perceived through the transparent substrate.

The light transmittance of the metallic glossy layer itself was measured with a spectrophotometer (U-3210, manufactured by Hitachi Ltd.) and was found to be 40%. The light transmittances of the laminate member were 3% and 15% when the reversibly thermochromic composition was in a colored state and in a decolored state, respectively.

EXAMPLE 5

Production of Reversibly Thermochromic Light-Shielding/Light-Transmitting Laminate Member with Metallic Luster A metallic luster ink obtained by evenly mixing 1 part of a metallic luster pigment (trade name, Iriodin 225; manufactured by Merck & Co., Inc.), 5 parts of a xylene solution (solid content, 50%) of an acrylic/polyol resin, 5 parts of xylene, and 1 part of an isocyanate hardener was applied by spraying to the reversibly thermochromic layer of the reversibly thermochromic light-shielding/light-transmitting laminate member produced in Example 2. Thus, a metallic glossy layer was formed. Thereafter, a topcoat ink obtained by evenly mixing 5 parts of a xylene solution (solid content, 50%) of an acrylic/polyol resin, 5 parts of xylene, 1 part of an isocyanate hardener, and 0.1 part of an ultraviolet absorber was applied to the metallic glossy layer by spraying. The resultant coating was dried at 70° C. for 30 minutes to form a transparent topcoat layer.

Upon cooling to 25° C. or lower, the reversibly thermochromic composition in the laminate member thus obtained assumed a blue color and, simultaneously therewith, the reversibly thermochromic layer became opaque. As a result, the engine was hidden and the laminate member was perceived as a minicar in which the hood was of a metallic blue color. When the laminate member was heated to 35° C. or higher, the reversibly thermochromic composition was decolored and, simultaneously therewith, the reversibly thermochromic layer became highly transparent. As a result, the engine could be perceived through the transparent substrate.

The light transmittance of the metallic glossy layer itself was measured with a spectrophotometer (U-3210, manufactured by Hitachi Ltd.) and was found to be 25%. The light transmittances of the laminate member were 2% and 10% when the reversibly thermochromic composition was in a colored state and in a decolored state, respectively.

COMPARATIVE EXAMPLE 1

A microencapsulated pigment was produced in the same manner as in Example 1, except that the particle diameter of the microencapsulated pigment in Example 1 was changed to 6.0 µm. Thereafter, a reversibly thermochromic material was prepared and a reversibly thermochromic laminate member was obtained, in the same manner as in Example 1.

When the laminate member thus obtained was heated to 36° C. or higher, the reversibly thermochromic composition was decolored but the reversibly thermochromic layer had poor transparency. As a result, not only the feeling of transparency given by the substrate was impaired but also the teddy bear enclosed could not be clearly perceived.

COMPARATIVE EXAMPLE 2

A reversibly thermochromic laminate member was obtained in the same manner as in Example 2, except that the polyurethane resin having an elongation at break of 225% used in Example 2 was replaced with a polyurethane resin having an elongation at break of 500%.

When the reversibly thermochromic laminate member thus obtained was cooled to 25° C. or lower, the reversibly thermochromic composition assumed a blue color but the reversibly thermochromic layer retained transparency. As a result, the engine disposed inside was not sufficiently hidden.

COMPARATIVE EXAMPLE 3

A microencapsulated pigment was produced in the same manner as in Example 2, except that the particle diameter of the microencapsulated pigment in Example 2 was changed to 6.0 µm. Using this pigment, a reversibly thermochromic laminate member was obtained in the same manner as in Example 2, except that in preparing a reversibly thermochromic material, the polyurethane resin having an elongation at break of 225% used in Example 2 was replaced with a polyurethane resin having an elongation at break of 500%.

When the laminate member thus obtained was heated to 35° C. or higher, the reversibly thermochromic composition was decolored but the reversibly thermochromic layered had poor transparency. As a result, not only the feeling of transparency given by the substrate was impaired but also the engine disposed inside could not be clearly perceived.

Furthermore, when the laminate member was cooled to 25° C. or lower, the reversibly thermochromic composition assumed a blue color but the reversibly thermochromic layer retained transparency. As a result, the engine disposed inside was not sufficiently hidden.

COMPARATIVE EXAMPLE 4

A reversibly thermochromic material was obtained by dissolving a reversibly thermochromic composition consisting of 1.5 parts of 1,2-benz-6-(N-ethyl-N-isobutylamino) fluoran as an electron-donating color-forming organic compound (a), 5 parts of 1,1-bis(4-hydroxyphenyl)-n-decane as an electron-accepting compound (b), and 5 parts of stearyl caprate and 15 parts of stearyl laurate as reaction media (c) in 300 parts of an MIBK solution containing 20% vinyl chloride/vinyl acetate copolymer resin.

A platy piece as a substrate was molded from an ABS resin. This substrate was coated with the reversibly thermochromic material by spraying, and the resultant coating was dried at 70° C. for 60 minutes to form a reversibly thermochromic layer (thickness, 15 µm).

When the laminate member thus obtained was cooled to 12° C. or lower, the reversibly thermochromic composition assumed a pink color and, simultaneously therewith, the reversibly thermochromic layer became opaque. As a result, the laminate member became pink. When the laminate member was heated to 39° C. or higher, the reversibly thermochromic composition became colorless and the reversibly thermochromic layer became transparent. As a result, the laminate member became transparent.

However, the reversibly thermochromic composition assumed no color when the laminate member was cooled after two-week standing. Namely, the function of changing in color had been impaired. It is presumed that the ABS resin serving as the substrate partly dissolved and exerted a chemical influence on the reversibly thermochromic composition to inhibit its color change function.

As described above, the invention can provide a reversibly thermochromic light-shielding/light-transmitting laminate member which has a satisfactory thermochromic function and undergoes alternate color changes between a colorless transparent state and a colored opaque state.

While the invention has been described in detail and with reference to specific embodiments thereof, it will be apparent to one skilled in the art that various changes and modifications can be made therein without departing from the spirit and scope thereof.

This application is based on Japanese patent applications No. 2000-368016 filed Dec. 4, 2000 and No. 2001-316343 filed Oct. 15, 2001, the entire contents thereof being hereby incorporated by reference.

What is claimed is:

1. A reversibly thermochromic light-shielding/light-transmitting laminate member which comprises a substrate and formed thereon a reversibly thermochromic layer comprising a transparent resin and fixedly dispersed therein a reversibly thermochromic microencapsulated pigment containing a reversibly thermochromic composition comprising (a) an electron-donating color-forming organic compound, (b) an electron-accepting compound, and (c) a reaction medium determining the temperatures at which the color reactions of component (a) with component (b) take place, the reversibly thermochromic microencapsulated pigment being a deformable pigment which has an average particle diameter of from 0.1 to 5.0 µm, the transparent resin having a tensile elongation at break of 350% or lower.

2. The reversibly thermochromic light-shielding/light-transmitting laminate member of claim 1, wherein the proportion of the reversibly thermochromic microencapsulated pigment to the transparent resin is from 1/0.5 to 1/20 in terms of weight ratio on a solid basis and the reversibly thermochromic layer has a thickness of from 5 to 100 µm.

3. The reversibly thermochromic light-shielding/light-transmitting laminate member of claim 1, wherein the transparent resin is a resin selected from the group consisting of methyl methacrylate resins, acrylic resins, vinyl chloride/vinyl acetate copolymer resins, ethylene/vinyl acetate copolymer resins, saturated polyester resins, unsaturated polyester resins, butyral resins, polyurethane resins, polyamide resins, styrene resins, acrylic/styrene resins, ketone resins, and epoxy resins.

4. The reversibly thermochromic light-shielding/light-transmitting laminate member of claim 1, which has, formed over the reversibly thermochromic layer, a metallic glossy layer containing a metallic luster pigment having transparency.

5. The reversibly thermochromic light-shielding/light-transmitting laminate member of claim 4, wherein the metallic glossy layer has a light transmittance of 5% or higher.

* * * * *